US012580221B2

(12) United States Patent
Afshari et al.

(10) Patent No.: US 12,580,221 B2
(45) Date of Patent: Mar. 17, 2026

(54) SOLID-STATE COMPOSITE ELECTROLYTES COMPRISING ARAMID POLYMER FIBRILS

(71) Applicant: DUPONT SAFETY & CONSTRUCTION, INC., Wilmington, DE (US)

(72) Inventors: Mehdi Afshari, Midlothian, VA (US); Byoung Sam Kang, Midlothian, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 102 days.

(21) Appl. No.: 17/194,796

(22) Filed: Mar. 8, 2021

(65) Prior Publication Data

US 2021/0296685 A1     Sep. 23, 2021

Related U.S. Application Data

(60) Provisional application No. 62/990,636, filed on Mar. 17, 2020.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC .......... H01M 10/0525; H01M 10/0561–0562; H01M 2300/0068–0077; H01M 50/44; H01M 50/423; H01M 50/494; H01M 50/431; H01M 50/497; H01M 50/446; H01M 10/0562–0565; H01M 2300/0065–0082; H01M 10/056; H01M 50/403; D21H 13/12; D21H 15/02; D21H 13/20–26; D21H 5/02; D04H 1/4342; Y02E 60/10
See application file for complete search history.

(56) References Cited

U.S. PATENT DOCUMENTS

| | | | |
|---|---|---|---|
| 3,869,429 A | 3/1975 | Blades | |
| 4,308,374 A | 12/1981 | Vollbracht et al. | |
| 4,698,414 A | 10/1987 | Bair | |
| 5,073,440 A | 12/1991 | Lee | |
| 5,084,136 A | 1/1992 | Haines et al. | |
| 5,094,913 A | 3/1992 | Yang | |
| 5,171,402 A | 12/1992 | Haines et al. | |
| 5,202,184 A | 4/1993 | Brierre et al. | |
| 5,532,059 A * | 7/1996 | Lee ........................... | D01F 6/90 525/182 |
| 8,211,272 B2 | 7/2012 | Levit et al. | |
| 2005/0284596 A1 | 12/2005 | Conley et al. | |
| 2006/0011370 A1 | 1/2006 | Foersterling et al. | |
| 2007/0082198 A1 * | 4/2007 | Henriks ................. | D21H 13/26 428/375 |
| 2011/0147301 A1 * | 6/2011 | Johnson ................... | D04H 1/56 210/508 |
| 2011/0174158 A1 * | 7/2011 | Walls ................... | D01D 5/0092 96/60 |
| 2013/0280509 A1 * | 10/2013 | Alvarado Chacon .. | D21H 13/26 428/219 |
| 2016/0036252 A1 | 2/2016 | Peterswerth et al. | |
| 2017/0020425 A1 | 1/2017 | Holmes et al. | |
| 2018/0375148 A1 * | 12/2018 | Yersak ...................... | C03C 3/32 |
| 2020/0005633 A1 | 1/2020 | Jin et al. | |
| 2020/0056332 A1 * | 2/2020 | Afshari ................. | D21H 13/12 |

FOREIGN PATENT DOCUMENTS

| | | | | |
|---|---|---|---|---|
| CN | 107978789 A | * | 5/2018 | .......... H01M 10/052 |
| WO | 2019228972 A1 | | 12/2019 | |
| WO | 2020036800 A1 | | 2/2020 | |

OTHER PUBLICATIONS

CN-107978789-A Machine Translation.*
Hot Pressed, Fiber-Reinforced (Li2S)70 (P2S5)30 Solid-State Electrolyte Separators for Li Metal Batteries (ACS Appl. Energy Mater., 2019, 2, pp. 3523-3531).
S. Brunauer, P. H. Emmett, and E. Teller, "Adsorption of Gases in Multimolecular Layers", J. Am. Chem. Soc. 1938, 60, 309.
PCT International Search Report, mailed Jun. 23, 2021, Application No. PCT/US2021/022324, International filing date Mar. 15, 2021; ISA European Patent Office; Miriam Lackova, Authorized Officer.

* cited by examiner

*Primary Examiner* — Allison Bourke
*Assistant Examiner* — Bethany C Garcia

(57) ABSTRACT

A solid-state composite electrolyte, suitable for use in solid-state batteries, and a battery comprising same, the solid-state composite electrolyte comprising 70 to 99 weight percent inorganic solid electrolyte and 1 to 30 weight percent aramid polymer fibrils, based on the total weight of the inorganic solid electrolytes and aramid fibrils in the solid-state composite electrolyte, wherein the aramid polymer fibrils have:
   i) a diameter of 10 to 2000 nanometers,
   ii) a length of 0.2 to 3 millimeters,
   iii) a specific surface area of 3 to 40 square meters/gram, and
   iv) a Canadian Standard Freeness of 0 to 100 milliliters;
the solid-state composite electrolyte having a thickness of 5 to 1000 micrometers.

11 Claims, 4 Drawing Sheets

SOLID-STATE COMPOSITE ELECTROLYTES COMPRISING ARAMID POLYMER FIBRILS

BACKGROUND OF THE INVENTION

This invention relates to fiber-reinforced solid-state composite electrolytes suitable for use in solid-state batteries.

The publication of Yersak et al., "Hot Pressed, Fiber-Reinforced $(Li_2S)_{70}$ $(P_2S_5)_{30}$ Solid-State Electrolyte Separators for Li Metal Batteries" (*ACS Appl. Energy Mater.*, 2019, 2, pp. 3523-3531) discloses the densification of aramid-fiber-reinforced $(Li_2S)_{70}$ $(P_2S_5)_{30}$ solid-state electrolyte composite electrolyte separators via hot pressing at 240° C. and 200 MPa. The publication further discloses data for composite electrolyte thicknesses of 540 to 920 micrometers and provides a photo of a single thin composite electrolyte sample said to have a thickness of 100 micrometers. As evident by SEM images in this publication the aramid fiber pulp by itself occupies a large area in the cross section of the composite electrolyte.

As more efficient, lightweight, and varied batteries are developed, it has been found that the ability to manufacture a wide range of solid state electrolyte thicknesses is desired, including the flexibility to manufacture very thin solid-state composite electrolytes. In some cases, solid-state composite electrolytes having a thickness less than 100 micrometers are desired, and in some instances thicknesses significantly less than 100 micrometers are desired. However, it is believed this thinner solid-state electrolyte development has been hampered by the lower mechanical strength of the inorganic solid electrolyte, requiring the need for reinforcement. Further, as illustrated in the publication of Yersak et al., the large size of the pulp fiber is not practical as reinforcement for very thin solid-state composite electrolytes. What is needed, therefore, is a solid-state composite electrolyte suitable for use in a solid state battery that has suitable fiber reinforcement that allows for flexibility in manufacture that includes the ability to manufacture very thin solid-state composite electrolytes.

BRIEF SUMMARY OF THE INVENTION

This invention relates to a solid-state composite electrolyte, suitable for use in solid-state batteries, comprising 70 to 99 weight percent inorganic solid electrolyte and 1 to 30 weight percent aramid polymer fibrils, based on the total weight of the inorganic solid electrolytes and aramid fibrils in the solid-state composite electrolyte, wherein the aramid polymer fibrils have:

i) a diameter of 10 to 2000 nanometers, ii) a length of 0.2 to 3 millimeters, iii) a specific surface area of 3 to 40 square meters/gram, and iv) a Canadian Standard Freeness of 0 to 100 milliliters;

the solid-state composite electrolyte having a thickness of 5 to 1000 micrometers.

This invention also relates to a process for making a solid-state composite electrolyte, suitable for use in solid-state batteries, comprising the steps of:

a) combining 70 to 99 parts by weight inorganic solid electrolyte and 1 to 30 parts by weight aramid polymer fibrils, based on 100 total parts of the inorganic solid electrolyte and aramid fibrils, to form a mixture;

b) consolidating the mixture by the application of pressure and heat for a time sufficient to form a solid-state composite electrolyte having a thickness of 5 to 1000 micrometers;

wherein the aramid polymer fibrils have:

i) a diameter of 10 to 2000 nanometers, ii) a length of 0.2 to 3 millimeters, iii) a specific surface area of 3 to 40 square meters/gram, and iv) a Canadian Standard Freeness of 0 to 100 milliliters.

DETAILED DESCRIPTION OF THE INVENTION

Figure 1:
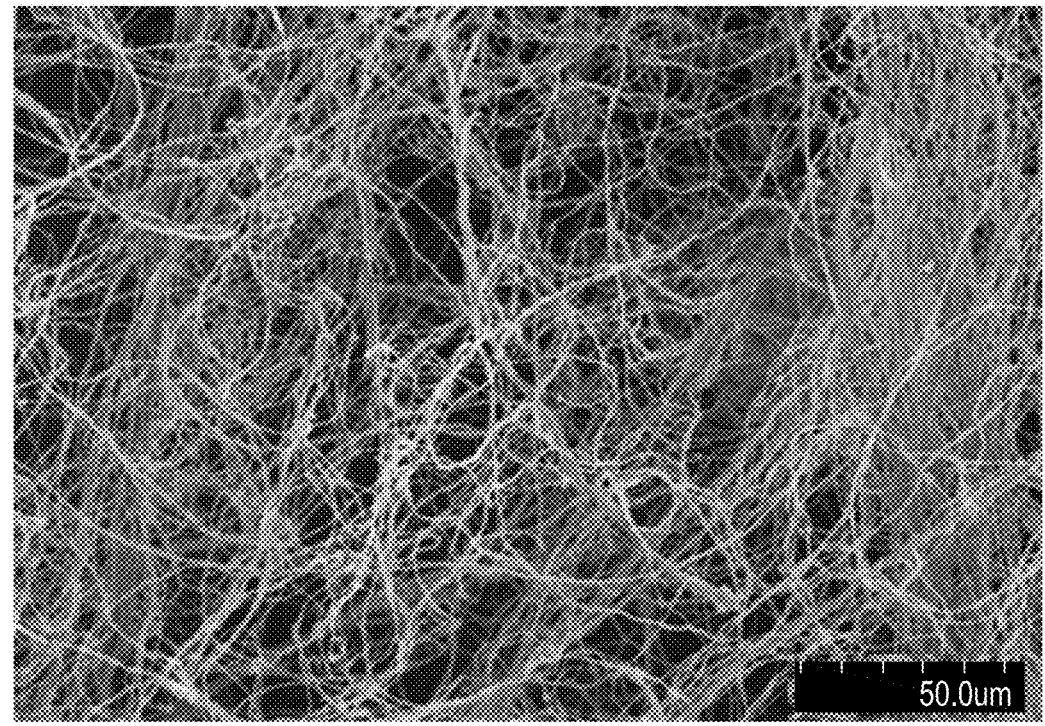
FIG. 1 is a digital photo, taken at 1000× magnification, of aramid polymer fibrils.

This invention relates to a solid-state composite electrolyte suitable for use in solid-state batteries and a solid-state battery comprising that solid-state composite electrolyte. The solid-state composite electrolyte comprises 70 to 99 weight percent inorganic solid electrolyte and 1 to 30 weight percent aramid polymer fibrils, based on the total weight of the inorganic solid electrolytes and aramid fibrils in the composite electrolyte. In some preferred embodiments, the aramid polymer fibrils are the sole fibrous components in the composite electrolyte. The aramid polymer fibrils have a diameter of 10 to 2000 nanometers, a length of 0.2 to 3 millimeters, a specific surface area of 3 to 40 square meters/gram, and a Canadian Standard Freeness of 0 to 100 milliliters.

A solid-state battery (SSB) is a battery technology that uses solid electrodes and a solid electrolyte, instead of the liquid or polymer gel electrolytes found in lithium-ion or lithium polymer batteries. By "solid-state composite electrolyte", it is meant a solid-state electrolyte made from an inorganic material that further has fibrous reinforcement that enhances the mechanical properties of the solid-state electrolyte. Preferably, the fibrous material is uniformly distributed throughout the solid-state composite electrolyte.

As used herein, the term "battery" is intended to include not only batteries but also such things as capacitors and other devices having (1) a cathode, (2) an anode, (3) a physical separating device between the cathode and anode to help prevent short-circuiting, and (4) some type of electrolyte. Specifically, in solid state batteries the solid electrolyte also acts as the battery separator located between the positive (cathode) and negative (anode) plates and providing a structural separation between these electrodes of opposite charge, while allowing the electrolyte to assist the passage of current through the separator.

It is believed the use of very small diameter aramid polymer fibrils as the fibrous reinforcement in the solid-state composite electrolyte enhances the mechanical performance of solid-state composite electrolyte; and is particularly useful in very thin solid-state composite electrolytes, as the smaller fibers are better and more evenly distributed throughout the solid-state composite electrolyte. The addition of the aramid polymer fibrils is also believed to improve the flexibility of the solid-state composite electrolyte, allowing the solid-state composite electrolyte to withstand some flexing without creating objectionable cracks.

The term aramid, as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other supporting material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The term "aramid polymer fibrils", as used herein, are hair-like fibrous material having a diameter of 10 to 2000 nanometers, preferably 10 to 1200 nanometers, that is made from an aramid polymer, or polymer blend containing at least two polymers wherein a majority amount (greater than 50 weight percent) of aramid polymer is present. FIG. 1 is representative digital photo of aramid polymer fibrils. Aramid polymer fibrils further have a preferred length of 0.2 to 3 millimeters. The "length" of the fibrous material referred to herein, such as the aramid polymer fibrils and pulps, is meant to be the measured "length-weighted average" length. In some preferred embodiments, the aramid polymer fibrils are refined aramid polymer fibrils made from floc by exposing the floc to a refining step that shears the floc into the smaller aramid polymer fibrils. In some preferred embodiments, the aramid polymer fibrils have a length that is 0.4 to 3 millimeters (mm), preferably 0.8 to 3 mm.

It is believed the diameter of the aramid polymer fibrils has an impact on the pore size of the solid-state composite electrolyte, and aramid polymer fibrils having a diameter of greater than 2000 nanometers create a solid-state composite electrolyte having an undesirably high pore size, which can ultimately result in micro cracks and short circuiting of the electrolyte. Also, it is believed that aramid polymer fibrils having a diameter of less than 10 nanometers or a length of less than about 0.2 millimeters do not contribute to the solid-state composite electrolyte mechanical strength, therefore it is desirable that a majority of the aramid polymer fibrils have a length of 0.2 millimeters or greater. In addition, the small diameter of the aramid polymer fibrils facilitates the use of the fibrous material in very thin solid-state composite electrolytes.

The aramid polymer fibrils further have an aspect ratio that can range from about 150 to 300,000. The aspect ratio is also known as the length divided by the diameter, and the phrases "aspect ratio", "average length-to-diameter ratio", and "length-to-diameter" are used interchangeably herein. In some embodiments, the average length-to-diameter ratio of the aramid polymer fibrils is about 1000 or greater. In some embodiments, the aramid polymer fibrils have an average length-to-diameter ratio of about 3000 or less. In some preferred embodiments, the average length-to-diameter ratio ranges from about 1000 to 3000. It is believed that the higher average length-to-diameter ratio of the aramid polymer fibrils contribute to better mechanical reinforcement, and therefore better mechanical properties of the composite electrolyte.

Because the qualitative measurements of certain fibrous materials like aramid polymer fibrils can be difficult, such fibrous materials can be compared by measuring the "freeness" of the fiber material. The most popular techniques that measure freeness measure either the Canadian Standard Freeness (CSF) or the Schopper-Riegler Freeness (SRF).

The inventors believe the Canadian Standard Freeness (CSF) as the preferred technique for characterizing the aramid polymer fibrils used herein. The aramid polymer fibrils are preferably made by refining aramid polymer fibers or floc to make the fibrils; such fibrils preferably have a CSF of 0 to 50 milliliters, and in some embodiments, have a CSF of 0 to 20 milliliters. CSF is one indication of the fineness of the aramid polymer fibrils, or the degree they are fibrillated during refining, with very fine aramid polymer fibrils having a very low CSF. Low CSF values also are indicative of uniformly sized fibrils, as materials having a wide distribution of sizes generally have high CSF values.

The aramid polymer fibrils defined herein are fibrous material and are distinct from the aramid polymer pulps of the prior art. Such aramid polymer pulps are preferably made by refining floc or can be made directly from ingredients as was taught in U.S. Pat. Nos. 5,202,184; 5,523,034; and 5,532,034. However, not only do such processes provide fibrous material having a wider range of fiber sizes and lengths, due to the difficulty of controlling such processes, the processes and can provide both "stalks" and fibrils extending from the stalks, with the stalk being a generally columnar remnant of the original aramid polymer floc and being about 10 to 50 microns in diameter. Further, in the case of aramid polymer pulp, the length measurement is understood to be the length of the stalk feature of the pulp, which is also referred to as the "pulpstalk".

Also, the average length-to-diameter ratio of the aramid polymer fibrils is far greater than the average length-to-diameter ratio for conventional aramid polymer pulp, such as made by the processes in U.S. Pat. Nos. 5,084,136; 5,171,402; and 8,211,272, which is believed to have an average length-to-diameter ratio generally less than 150; or the average length-to-diameter ratio of highly refined pulp such as disclosed in US patent publications 2016/0362525 and 2017/0204258 which is believed to have an average length-to-diameter ratio less than that of conventional pulp (e.g., generally less than 100).

Further, the aramid polymer fibrils, as used in the composite electrolyte, have essentially no stalks present or are stalk-free aramid polymer fibrils. As used herein, the term "stalk-free aramid polymer fibrils" means that at least 95% by weight of the fibrous material are aramid polymer fibrils having the desired diameter of 10 to 2000 nanometers by optical measurement of a fibril sample using 500× or 1000× magnification. In some embodiments, at least 98% by weight of the fibrous material are aramid polymer fibrils having the desired diameter of 10 to 2000 nanometers by optical measurement of a fibril sample using 500× or 1000× magnification. In some embodiments, 100% by weight of the fibrous material are aramid polymer fibrils having the desired diameter of 10 to 2000 nanometers by optical measurement of a fibril sample using 500× or 1000× magnification.

Figure 2:
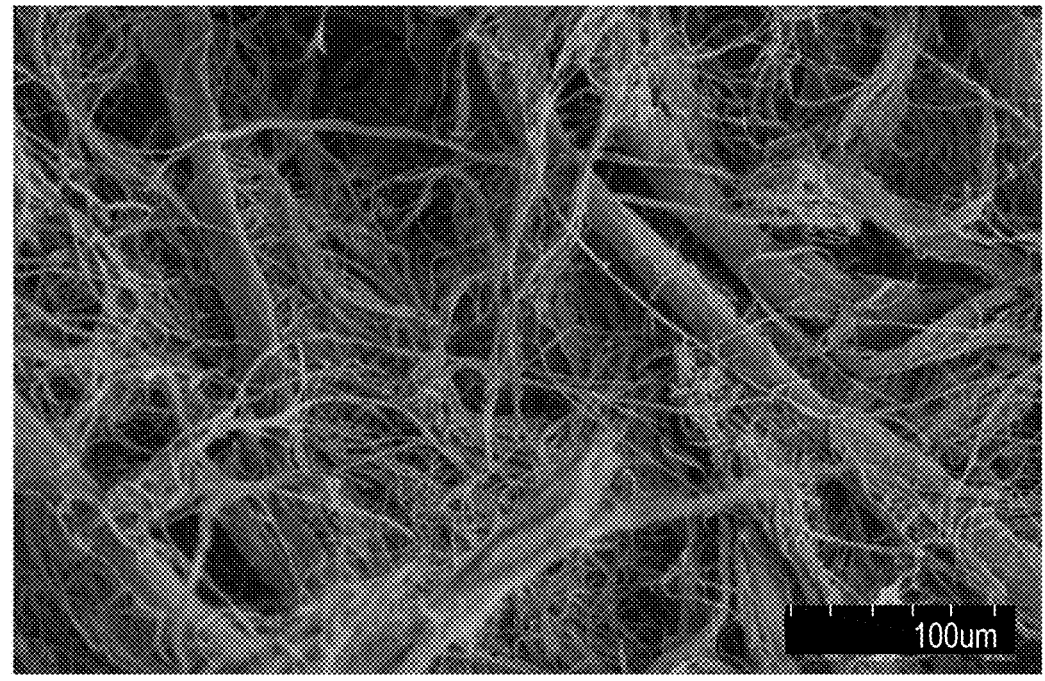
FIG. 2 is a digital photo, taken at 500× magnification, of a commercially available aramid pulp.

One preferred method of generating stalk-free aramid polymer fibrils is to refine a fiber or floc made from a polymer blend containing at least two polymers wherein a majority amount (greater than 50 weight percent) of aramid polymer is present. One preferred polymer blend is a polymer blend of 80 to 96 weight percent polyparaphenylene terephthalamide (PPD-T) and 4 to 20 weight percent of polyvinylpyrrolidone (PVP). When aramid fiber or aramid floc made from this PPD-T/PVP polymer blend is refined, the resulting fibrous material is essentially all fibrils and there are essentially no larger stalks present in the material, as shown in the digital photo of FIG. 1. It is believed that at least 4 weight percent PVP must be present in the original fiber or floc in order for the fiber or floc to be refined into fibrils with essentially no stalks remaining. This is compared to traditional refined aramid pulp made from polyparaphenylene terephthalamide (PPD-T) homopolymer as shown in FIG. 2, having visible stalks.

It has been found that the porosity and the crystal nature of filaments made from the blend of 80 to 96 weight percent PPD-T and 4 to 20 weight percent of PVP are dramatically different from filaments consisting solely of PPD-T. Herein, the term "fiber" is used interchangeably with the term "filament". Fiber spun directly from a polymer solution onto a bobbin without cutting is commonly referred to as continuous fiber or continuous filament, and multifilament yarns comprise a plurality of continuous filaments.

Figure 3:
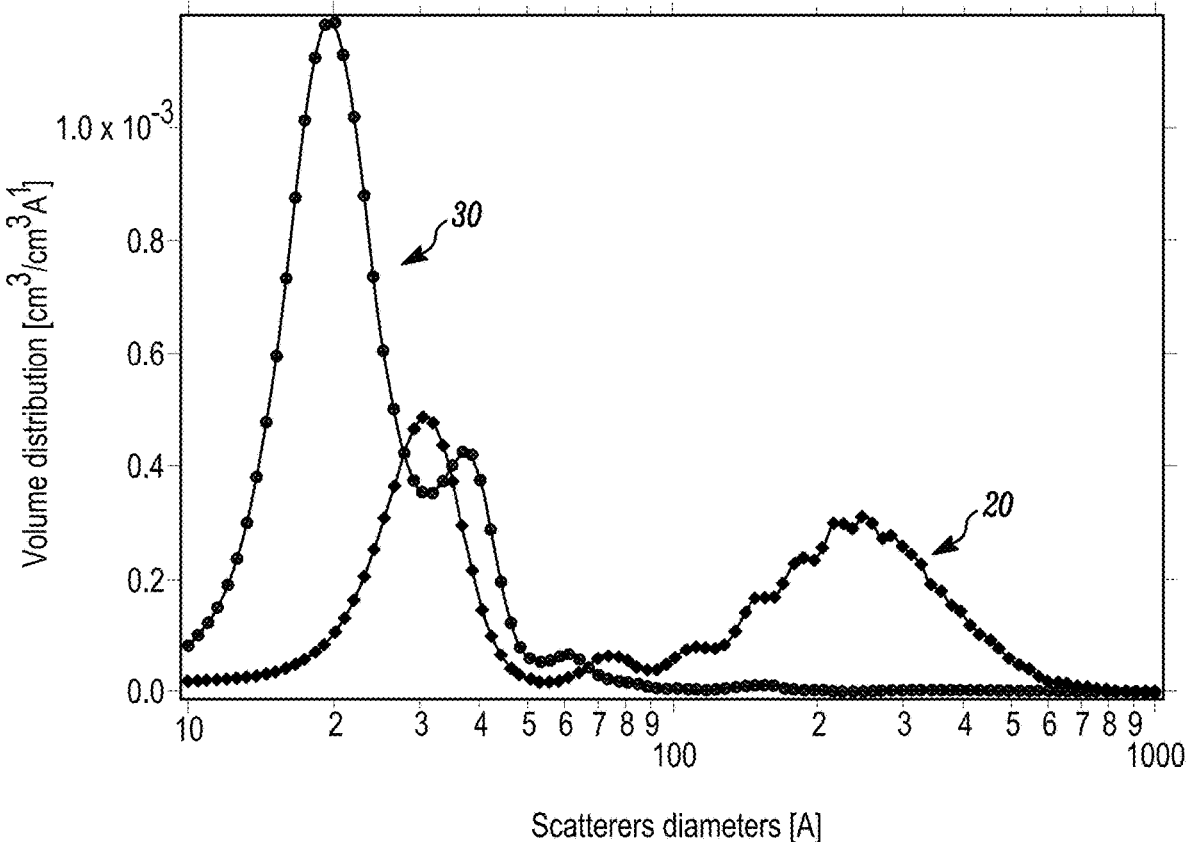
FIG. 3 is a graphical representation comparing the distribution of pores in PPD-T/PVP filaments versus PPD-T filaments.

FIG. 3 illustrates the difference in the x-ray scattering of the two types of filaments. Curve 20 is representative of the PPD-T/PVP blend filaments, while curve 30 is representative of the filaments made solely with PPD-T. Curve 30 illustrates the PPD-T filaments have a significant peak centered at about 2 angstroms (and a much lesser peak centered around 4 angstroms) indicating very small pores in the fiber. Curve 20 illustrates the PPD-T/PVP blend has a much broader distribution of pore size, with a peak centered at about 3 angstroms and a very broad sloping peak centered at about 250 angstroms but extending over an area ranging from about 70 to 600 angstroms. It is believed this indicates the filaments made from the PPD-T/PVP blend have a very large number of much larger pores than the PPD-T filaments.

Further, it is believed that because of this difference in the fiber crystallinity and pore structure, when the filaments are mechanically refined, the result is a much finer and more uniform distribution of fibrils, as illustrated in FIG. 1. In other words, it is believed the very high crystallinity and low porosity of the PPD-T fiber means that when it is mechanically refined, the refining shearing action primarily abrades the surface of the filaments creating the typical stalks-with-fibrils structure (as shown in FIG. 2); while the lower crystallinity and high porosity of the PPD-T/PVP blend filaments makes them more conducive to easy separation into individual refined fibrils under the same shearing action; with a larger number of smaller and relatively more uniform diameter fibrils, and more importantly essentially without any stalks (i.e., stalk-free). It is believed the aramid polymer fibrils have a relatively uniform diameter having a total diameter size range of about 300 nanometers as measured visually from SEM photomicrographs.

The aramid polymer fibrils are preferably made from aramid floc having as the majority polymeric material component by weight PPD-T, and at least one other polymeric material component; these components are preferably mutually immiscible so that the at least two polymeric materials will be present in the floc in closely-mixed but separate solid phases. Such aramid flocs, when refined, yield aramid polymer fibrils with domains of two distinct polymeric materials; one phase being the continuous or primary polymer phase, or the PPD-T polymer, and the other phase being the discontinuous or secondary polymer phase, which is in the preferred instance PVP polymer.

It is believed the discontinuous or secondary polymer phase is present as small, nanometer-sized crystal domains of material running through the floc and serving, in the refining process, as points of disruption in the floc structure to promote ready and more complete refining of the floc into fibrils. After the refining, a portion of the discontinuous or secondary polymer from each disruption point is present on or at the surface of each fibril that results from the refining process.

The aramid polymer fibrils also have high surface area. The words "surface area", "specific surface area", and "BET surface area" are used interchangeably herein. The aramid polymer fibrils have a specific surface area of from about 3 to 40 m$^2$/g. In some embodiments, the specific surface area is 6 m$^2$/g or greater; in some embodiments, the specific surface area is 8 m$^2$/g or greater. One particularly preferred range of specific surface area is from 6 to 20 m$^2$/g.

Comparatively, traditional pulp refined from floc made from a single polymeric material, or from a miscible blend of polymeric materials that does not have the domains of discontinuous secondary polymer, will not have such a high surface area. Further, if this floc is refined enough to have such a measured high surface area, the resulting pulp particles have such a low aspect ratio (resulting from very low average length) they will not provide adequate reinforcement of the composite.

The preferred aramid fibrils comprise 80 to 96 weight percent poly (paraphenylene terephthalamide) (also known and used herein as polyparaphenylene terephthalamide or PPD-T). By PPD-T is meant the homopolymer resulting from mole-for-mole polymerization of p-phenylene diamine and terephthaloyl dichloride and, also, copolymers resulting from incorporation of small amounts of other diamines with the p-phenylene diamine and of small amounts of other diacid chlorides with the terephthaloyl dichloride. As a general rule, other diamines and other diacid chlorides can be used in amounts up to as much as about 10 mole percent of the p-phenylene diamine or the terephthaloyl dichloride, or perhaps slightly higher, provided only that the other diamines and diacid chlorides have no reactive groups which interfere with the polymerization reaction. PPD-T also means copolymers resulting from incorporation of other aromatic diamines and other aromatic diacid chlorides such as, for example, 2,6-naphthaloyl chloride or chloro- or dichloro-terephthaloyl chloride; provided, only that the other aromatic diamines and aromatic diacid chlorides be present in amounts which permit anisotropic preparation of anisotropic spin dopes. Preparation of PPD-T is described in U.S. Pat. Nos. 3,869,429; 4,308,374; and 4,698,414.

The preferred aramid fibrils also comprise 4 to 20 weight percent of poly (vinyl pyrrolidone) (also known and used herein as polyvinylpyrrolidone or PVP. By PVP is meant the polymer which results from linear polymerization of monomer units of N-vinyl-2-pyrrolidone and includes small amounts of co-monomers that may be present in concentrations below those that do not interfere with the interaction of the PVP with the PPD-T. PVP of molecular weights ranging from as little as about 5000 to as much as about 1,000,000 can be used. PVP of very high molecular weight yields spinning dopes of high viscosity. PVP with a molecular weight of about 10,000 to about 360,000 is preferred.

The solid-state composite electrolyte comprises inorganic solid electrolyte and aramid polymer fibrils. In some embodiments, the inorganic solid electrolyte comprises lithium sulfide, lithium oxide, a mixture of lithium sulfide and lithium oxide, phosphorus sulfide, or mixtures of any of these sulfides/oxides. In some embodiments, the inorganic solid electrolyte comprises a blend of lithium sulfide or lithium oxide and phosphorus sulfide. In some preferred embodiments, the inorganic solid electrolyte comprises a blend of 60 to 80 weight percent lithium sulfide or lithium oxide or a mixture thereof, and b) 20 to 40 weight percent phosphorus sulfide, based on the total weight of a) and b) in the inorganic solid electrolyte. In some most preferred embodiments, the inorganic solid electrolyte comprises a blend of 70 to 80 weight percent lithium sulfide or lithium oxide or a mixture thereof, and b) 20 to 30 weight percent phosphorus sulfide, based on the total weight of a) and b) in the inorganic solid electrolyte.

The inorganic solid electrolyte can also be selected from zirconia, germanium compounds, silicon compounds, or mixtures thereof. These can be used either in addition to the previously mentions sulfides and/or oxides, in an amount of 20 weight percent or more, based on the total weight of the inorganic solid electrolyte; or used separately in the solid-state composite electrolyte.

The solid-state composite electrolyte comprises 70 to 99 weight percent inorganic solid electrolyte and 1 to 30 weight percent aramid polymer fibrils, based on the total weight of the inorganic solid electrolyte and aramid fibrils in the composite electrolyte. It is believed the solid-state compos- ite electrolyte will have improved properties when the total weight of the inorganic solid electrolyte and aramid fibrils in the composite electrolyte has as little as least one weight percent aramid polymer fibrils; and, also, that there is a diminishing property improvement when the composite has as more than 30 weight percent aramid polymer fibrils. In some embodiments, the solid-state composite electrolyte has at least 3 weight percent fibrils, based on the total weight of the inorganic solid electrolyte and aramid fibrils in the composite electrolyte. In some other embodiments, the solid-state composite electrolyte has at least 5 weight per- cent fibrils, based on the total weight of the inorganic solid electrolyte and aramid fibrils in the composite electrolyte. In some embodiments, the solid-state composite electrolyte has 20 weight percent fibrils or less, while in some other embodiments, the solid-state composite electrolyte has 15 weight percent fibrils or less, both embodiments being based on the total weight of the inorganic solid electrolyte and aramid fibrils in the composite electrolyte. In some embodi- ments, the solid-state composite electrolyte has 5 to 15 weight percent fibrils, based on the total weight of the inorganic solid electrolyte and aramid fibrils in the compos- ite electrolyte.

The solid-state composite electrolyte has a number of preferred properties. Included in these preferred properties is a desired thickness, a desired fracture toughness, and a desired ionic conductivity. A flame-resistant fibrous rein- forcement is also desirable. The preferred solid-state com- posite electrolytes are non-flammable, as they can be made solely from the inorganic electrolyte and aramid polymer fibrils and do not require an additional polymeric binder. The aramid polymer fibrils as defined herein are inherently fire-resistant when used as reinforcing material. The aramid polymer fibrils also have a unique combination of high strength, high modulus, toughness and thermal stability (stable up to 350° C.) and electrochemical compatibility with wide range of electrode materials.

The solid-state composite electrolyte has a thickness of 5 to 1000 micrometers. This thickness range is compatible with the typical space available for a solid-state composite electrolyte as a separator in a SSB. Solid-state composite electrolyte thicknesses of lower than 5 micrometers are not thought to have adequate strength to handle battery manu- facturing steps and solid-state composite electrolyte thick- nesses of greater than 1000 micrometers have limited appli- cability due to limited space in a typical battery; also, such thicker solid-state composite electrolytes have increased cost, which is not desirable. In some embodiments, the thickness of the solid-state composite electrolyte is 10 micrometers or greater; in some embodiments, the thickness of the solid-state composite electrolyte is 800 micrometers or less. In some embodiments, the thickness of the solid- state composite electrolyte is 700 micrometers or less, and in some specialty applications, the thickness of the solid- state composite electrolyte is 400 micrometers or less. One preferred solid-state composite electrolyte thickness range is from 10 to 700 micrometers. Another preferred solid-state composite electrolyte thickness range is from 15 to 450 micrometers. Extremely thin solid-state composite electro- lytes are also desirable in some instances, those thin elec- trolytes having a thickness of 100 micrometers or less; thin electrolytes having thickness ranges such as 10 to 95 micrometers are especially desirable.

Figure 4:
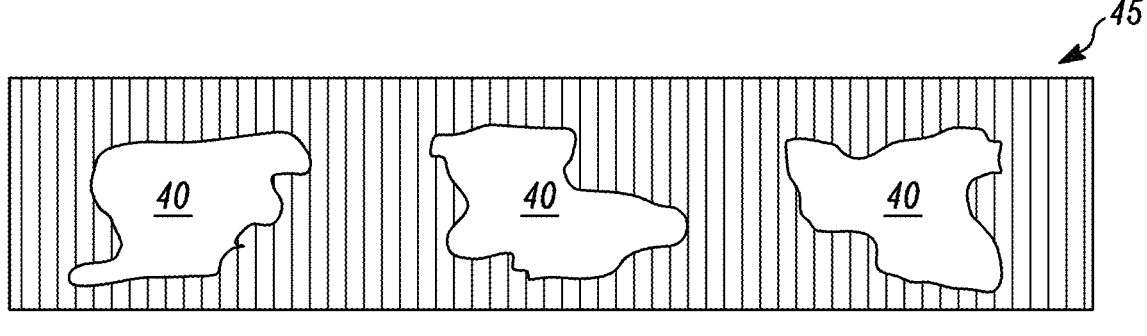
FIG. 4 is a highly idealized representation of a very thin solid-state composite electrolyte reinforced with aramid pulp.
Figure 5:
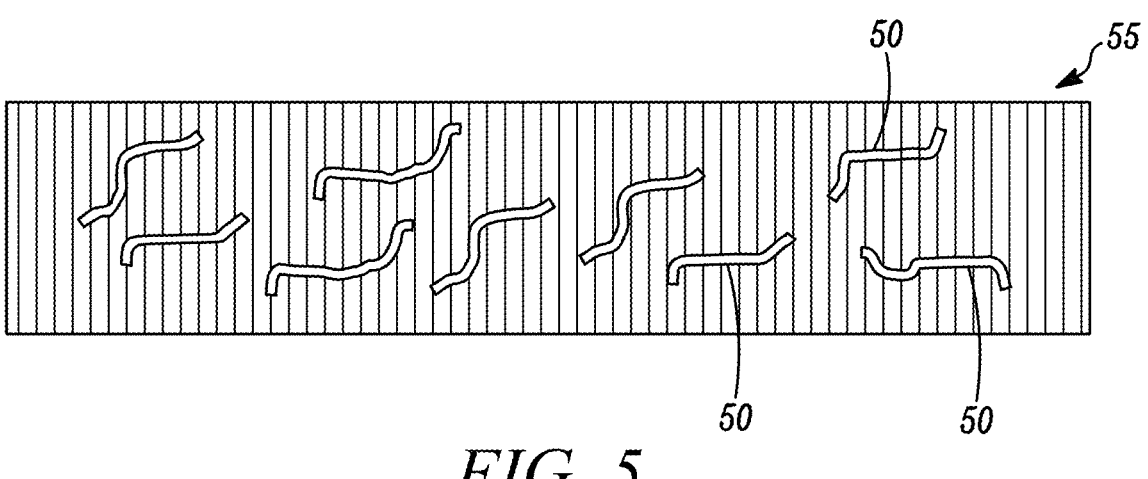
FIG. 5 is a highly idealized representation of a very thin solid-state composite electrolyte reinforced with aramid polymer fibrils.

FIGS. 4 & 5 illustrate in an idealized manner, the value of the aramid polymer fibrils over pulp in very thin solid-state composite electrolytes. FIG. 4 is an idealized representation of a very thin solid-state composite electrolyte 45 reinforced with masses of aramid pulp 40; while FIG. 5 is an idealized representation of a very thin solid-state composite electro- lyte 55 reinforced with aramid polymer fibrils 50. While the composite electrolyte or fibrous material in these figures is not strictly drawn to scale, it can be appreciated from FIG. 4 that the large size of the aramid pulp could become a problem as the composite thickness is reduced, as the pulp takes up too much volume or cross sectional area in the composite. However, as FIG. 5 illustrates, the aramid poly- mer fibrils, with their much smaller nanoscale dimensions, take up much less relative volume or cross sectional area in the composite, which provides the advantages already stated herein.

The solid-state composite electrolyte preferably has a fracture toughness of from 0.5 to 10 megapascals-square root meters (MPa m$^{1/2}$). This range is important because solid electrolytes such as sulfide glass are intrinsically fragile due to their glass-ceramic state. This is one of the significant challenges in manufacturing process for produc- ing inorganic electrolytes without producing macro or micro cracks. A fracture toughness of less than 0.5 MPa m$^{1/2}$ is not desired because such brittle structures are difficult to handle without damage. A fracture toughness of greater than 10 MPa m$^{1/2}$ is believed to be the upper limit of reinforcement provided by the addition of the aramid polymer fibrils. In some embodiments, the solid-state composite electrolyte preferably has a fracture toughness of at least 0.5 MPa m$^{1/2}$. In some embodiments the solid-state composite electrolyte preferably has a fracture toughness of 5 MPa m$^{1/2}$ or less. One preferred solid-state composite electrolyte fracture toughness range is from 1 to 5 MPa m$^{1/2}$.

The solid-state composite electrolyte preferably has an ionic conductivity of 0.1 to 100 milliSiemens per centimeter (mS/cm). This range is important because ionic conductivity influences of solid state electrolyte battery performance. An ionic conductivity of less than 0.1 mS/cm is not desired because ionic conductivity is practically too low for use in a battery; that is, such an ionic conductivity has a very low Coulombic efficiency (CE) at room temperature, which is also called faradaic efficiency or current efficiency, which describes the charge efficiency by which electrons are trans- ferred in batteries. In some embodiments the solid-state composite electrolyte preferably has an ionic conductivity of at least 0.1 mS/cm. In some embodiments the solid-state composite electrolyte preferably has an ionic conductivity of 50 mS/cm or less. One preferred solid-state composite electrolyte ionic conductivity range is from 1 to 50 mS/cm. Another preferred solid-state composite electrolyte fracture ionic conductivity is from 1 to 25 mS/cm.

Aramid polymer fibrils are preferably made by solution spinning a continuous filament yarn from a dope containing an aramid polymer, cutting the continuous filament yarn into floc, and then mechanically refining that floc into fibrils using one or more refiners. In a preferred process the dope is a solution containing a combination of PPD-T polymer and PVP polymer in sulfuric acid. Example representative processes for making continuous filament yarn are found in U.S. Pat. Nos. 5,073,440 and 5,094,913 and US Pat. Pub. US2006/0113700. Aramid floc is then cut from the continuous filament yarn. Prior to refining, the aramid floc generally has a length of from about 2 millimeters to about 25.4 millimeters, in some instances 2 to 10 millimeters, or even 3 to 10 millimeters.

Aramid polymer fibrils are preferably produced from floc by refining or fibrillating the PPD-T/PVP floc using techniques that cut, masticate, or abrade the PPD-T/PVP floc using mechanical methods familiar to papers, e.g., dry and wet disc or cone refining, hydrapulping, and beating. Preferably the refining is conducted on a dispersion of the floc in water, and preferably the dispersion is refined multiple passes through the refiner. That is, the refined dispersion leaving the refiner is recycled back through the same or a second refiner for a second pass through the refiner, and so on. The starting dispersion generally has a solids content of about 1 to 4 weight percent of the floc in water.

If the floc is a PPD-T/PVP floc, the floc can be fully fibrillated to stalk-free aramid polymer fibrils after just three passes through the refiner and is then suitable for making solid-state composite electrolytes. The stalk-free aramid polymer fibrils have a very low Canadian Standard Freeness (CSF) compared to pulp made from fibers that have tendency to fibrillate into a mixture containing a large quality of stalks combined with fibrils. While suitable fibrils result from three passes through the refiner, additional passes through the refiner may be made, with as many as 20 or more passes thought useful to further distribute and uniformize the fibrils, as long as the final strength of the solid-state composite electrolyte is not negatively affected. Preferably the fibrils are made by recycling the dispersion through the refiner for 3 to 20 passes; in some embodiments 3 to 10 passes through the refiner are used.

It is believed that with adequate care, stalk-free aramid polymer fibrils could be obtained from more traditional PPD-T, acrylic, or cellulosic pulp if a subsequent process after the refining step was used to separate or recover the fibrils from the stalks. It is contemplated that if such fibrils met the definition of "stalk-free" as put forth herein they would be suitable fibrils for use in the composite electrolyte.

The solid-state composite electrolyte suitable for use in solid-state batteries can be made via a process comprising the steps of combining 70 to 99 parts by weight inorganic solid electrolyte and 1 to 30 parts by weight aramid polymer fibrils, based on 100 total parts of the inorganic solid electrolyte and aramid fibrils, to form a mixture; and consolidating the mixture by the application of pressure and temperature for a time sufficient to form a solid-state composite electrolyte having a thickness of 5 to 1000 micrometers; wherein the aramid polymer fibrils have a diameter of 10 to 2000 nanometers, a length of 0.2 to 3 millimeters, a specific surface area of 3 to 40 square meters/gram, and a Canadian Standard Freeness of 0 to 100 milliliters. The process for producing the solid-state composite electrolyte utilizes the same inorganic solid electrolyte(s) and the same aramid polymer fibrils as previously contemplated and described herein, including in all the various features and embodiments already provided herein.

Once refined, it is believed the fibril-water mixture can be mixed directly with the inorganic electrolyte followed by water removal; or the fibrils can be separated from the water first and optionally dried, and then mixed with the inorganic electrolyte. The inorganic electrolyte and aramid polymer fibril mixture can then be densified by pressing, for example, in a die at high pressure, such as 150 to 300 MPa or slightly higher. If desired the mixture can be preheated prior to the application of pressure, preferably to 240° C. or higher for 10 minutes or greater, followed by the application the pressure while the temperature is maintained for an hour or more. If desired, the solid electrolyte can be further annealed by removing the pressure but maintaining the temperature on the sample for 30 minutes or more.

The solid-state composite electrolyte can be used to make a solid-state battery comprising an anode, a cathode, and the solid-state composite electrolyte. For example, Solid State Batteries (SSBs) having a non-flammable solid electrolyte (SE) can have a significant jump in energy density by using a lithium (Li) metal anode. A major obstacle to the development of all solid state Li batteries is the lower ionic conductivity of the SE at room temperatures. Inorganic ceramic-based solid electrolytes have been developed to increase ionic conductivities. One of promising inorganic ceramic electrolyte with high ionic conductivity useful in SSBs is the LPS (binary $Li_2S$—$P_2S_5$) sulfide glass electrolyte, which has higher than 10-3 S/cm ionic conductivity at room temperature.

Test Methods

The following test methods were used in the Examples provided below.

Thickness is measured according to ASTM D374-99 and is reported in mils and is converted to micrometers.

Fracture Toughness is measured by ASTM C1421-10 "Standard Test Methods for Determination of Fracture Toughness of Advanced Ceramics at Ambient Temperature"

Ionic resistance was measured according to ASTM D7148-13 and reported in milliohms-cm$^2$.

Freeness. The Canadian Standard Freeness (CSF) of the fibrils or pulp was measured according to standard test method TAPPI T 227 using a Canadian Standard Freeness Tester Model 33-23 supplied by Testing Machines Inc., New Castle, DE, which measures the facility for water to drain from an aqueous slurry or dispersion of the fibrils/pulp and is inversely related to the degree of fibrillation of the pulp as a greater numbers of fibrils will reduce the rate at which water drains through the paper mat that forms during the test. Data obtained from the test under the standard conditions are expressed in milliliters of water that drain from a slurry of 3 grams of pulp in 1 liter of water. A lower value indicates that a more fibrillated pulp will retain more water and drain more slowly.

Freeness. The Schopper-Riegler Freeness (SRF) was determined per BS EN ISO 5267-1 2001. The Schopper-Riegler test is designed to provide a measure of the rate at which a dilute suspension of pulp may be dewatered. SR Freeness (drainability) may be expressed in degrees Schopper-Riegler. The fibrous material to be tested is prepared in accordance with the test conditions defined in the above identified ISO standard. A volume of 1000 ml of the prepared pulp is poured into the drainage chamber. The discharge from the bottom and side orifices is collected. The filtrate from the side orifice is measured in a special cylinder, graduated in SR degrees. A discharge of 1000 milliliters corresponds to 0 degrees Schopper-Riegler while a discharge of 0 milliliters corresponds to 100 degrees Schopper-Riegler.

Fiber length. The length ("length-weighted average" length) of the fibrous material was measured in accordance with TAPPI Test Method T 271.

Average Length-to-Diameter Ratio. This was the calculated by dividing the "length-weighted average" length of the fibrils or pulps by their respective average visually-measured diameters. "Length-weighted average" length means the calculated length from the following formula $$L_W = \frac{\sum n_i l_i^2}{\sum n_i l_i}$$

wherein $n$ is number of fibrils or pulpstalks and $\ell$ is length of the individual fibril or the stalk of the pulp (pulpstalk).

The average "visually-measured diameter" of the fibrils and/or pulps was obtained by visually measuring from a 500× or 1000× magnification photomicrograph of the fibrils and/or pulp the width of individual fibrils or the pulp stalks at several points (a least three) along the fibril or pulp stalk length. This was done for at least a dozen fibrils or pulp stalks pictured in the photomicrograph and an average visually-measured fiber diameter calculated.

The "length-weighted average" length of the fibrils and/or pulps were measured using a Fiber Expert tabletop analyzer supplied by from Metso Automation Inc., Kajaani, Finland. The analyzer takes photographic images of the fibrous material, which has been dispersed in water to form a slurry, with a digital CCD camera as the slurry flows through the analyzer and an integrated computer analyzes the fibers in these images to calculate their length expressed in millimeters as a weighted average. The "length-weighted average" length of the pulps were measured using a LS200 laser diffraction analyzer supplied by Beckman Coulter Inc., Miami, FL and expressed in micrometers.

Specific Surface Area. The specific surface area of on dry fibrous material (including fibrils) and was measured by nitrogen adsorption/desorption at liquid nitrogen temperature (77.3 K) using a Micromeritics ASAP 2405 Porosimeter and expressed in units of square meter per gram ($m^2$/g). Samples were out-gassed overnight at a temperature of 150° C., unless noted otherwise, prior to the measurements and the weight losses were determined due to adsorbed moisture. A five-point nitrogen adsorption isotherm was collected over a range of relative pressures, $P/P_0$, from 0.05 to 0.20 and analyzed according to the BET method (S. Brunauer, P. H. Emmett, and E. Teller, *J. Am. Chem. Soc.* 1938, 60, 309); P is the equilibrium gas pressure above the sample, $P_0$ is the saturation gas pressure of the sample, typically greater than 760 Torr.

Wide and Small Angle X-Ray Scattering test method was used to crystallinity and porosity measurements.

Instrument: Rigaku Micromax 007 custom pinhole SAXS system or Advanced Photon Source DND-CAT (sector 5), line ID-D.

X-ray source: for Rigaku instrument: rotating anode copper $k\alpha 1$ source. APS radiation energy is variable, but typically ~9 keV used (1.38 Å)

Detector: Bruker Vantec 2000 2048×2048 pixel 2D detector for Rigaku; set of three MAR detectors at APS, set up at wide-, mid-, and small-angle distances with simultaneous data collection. An unwarping routine is employed on the Vantec 2000 data collection software to correct for spatial and intensity fluctuations inherent to the detector.

Sample mounting: WAXS: straighten length of yarn with collodion solution; cut out small piece and affix single layer on sample plate. SAXS: wrap fiber around slotted sample plate ten times, fix with tape. Plate has holes in the middle of fiber bundles for x-ray transmission.

Data collection: Rigaku: data is collected for ½ hour per sample while under vacuum; APS data collection is typically 5 frames of about 1 second each, run in air. This is done twice, once with an attenuator (for high intensity at low q) and once without an attenuator. Data is stitched together at different distances/attenuations.

EXAMPLES

Reference Example A

Samples of aramid polymer fibrils suitable for use in making the solid-state composite electrolyte of the following examples were made as follows. Polyvinylpyrrolidone (PVP) polymer sold under the name of Sokalan® K30-P is obtainable from BASF. The polyparaphenylene terephthalamide (PPD-T) polymer was made using the general polymerization procedures as generally disclosed in U.S. Pat. Nos. 3,869,429; 4,308,374; and 4,698,414.

The PPD-T polymer/PVP polymer blend fiber was made by forming separate polymer solutions and spinning fibers per the general procedure shown in United States Publication US2006/0113700 to Hartzler, et al. The first solution was 19.5 wt % PVP in sulfuric acid and was made by mixing PVP in sulfuric acid at room temperature. The second solution was 19.5 wt % PPD-T also in sulfuric acid. The PVP polymer solution was then combined with the PPD-T solution and mixed to form a spinning solution having a blend of polymers. This was done by centerline injection of the PVP polymer solution by a gear pump into a pipe carrying the PPD-T polymer solution, followed by a static mixer. This formed dispersed PVP polymer solution particles in the continuous PPD-T polymer solution phase.

Fiber yarn was made by extruding the spinning solution having the blend of polymers through a spinneret having a plurality of spinneret holes to form dope filaments. Specifically, the spinning solution having a blend of polymer described previously were air-gap spun into a multifilament yarn by extrusion of the solution through a 667-hole spinneret having orifice diameters of 0.063 mm through an 0.8 cm air gap into an aqueous coagulating bath at a temperature of 5 degrees Celsius containing about 5% sulfuric acid. The multifilament yarn was then washed and neutralized to remove the sulfuric acid solvent and dried and wound on bobbins.

The yarn was cut into floc having a length of 0.25 inches (0.20 cm). The floc was then refined by a single disk 12-inch Andritz laboratory refiner, using a aqueous slurry having 2 weight percent floc. The PPD-T/PVP fibrils were adequately formed after only 3 passes in the refiner. A sample was taken for testing and the material refined 3 more passes. An additional sample was taken for testing and the material refined 3 more passes. Table 1 provides data on the resulting fibrils, indicating that very fine fibrils were obtainable with just 3 passes, including data on Canadian Standard Freeness (CSF) and Schopper-Riegler Freeness (SRF). After just 3 passes in the refiner, the PPD-T/PVP blend floc was fully fibrillated to fibrils with a CSF of zero. Increasing refining time, i.e. increasing number of passes through the refiner, reduced the length of the nanofibrils. As a comparison to the data in Table 1, PPD-T pulp made with 3 passes through the refiner had a CSF of approximately 300 ml.

TABLE 1

| No. of Passes | CSF (ml) | Average Length (mm) | SRF (degrees) |
|---|---|---|---|
| 3 | 0 | 2 | 54.8 |
| 6 | 0 | 1.6 | 44.2 |
| 7 | 0 | 1.0 | 25 |

Various compositions of the PPD-T/PVP blend fibrils were then compared to commercially available 100% PPD-T pulp, available from DuPont, Wilmington, DE. Table 2 provides characterization information on fibrils made with floc having different PPD-T/PVP blends and made with 3 passes through the refiner. The characterization of 100% PPD-T pulp made with 3 passes through the refiner is also shown.

Curve 20 of FIG. 3 is for the 87/13 PPD-T/PVP blend and Table 2 illustrates that with the inclusion of PVP, the apparent crystal size (ACS 110) of the PPD-T/PVP blend filaments decreased versus 100% PPD-T filaments and the PPD-T/PVP filaments have a much bigger pore size and distribution of pore size is totally different from curve 30, which is representative of PPD-T filaments that are used to make conventional PPD-T pulp.

TABLE 2

| PPD-T to PVP Ratio (wt. %) | Surface Area (m²/g) | ACS 110 (Å) | ACS 200 (Å) | ACS Mean (Å) | Orientation Angle (°) | Porosity Volume (%) | Medium Pore Size (nm) |
|---|---|---|---|---|---|---|---|
| 87/13 | 14 | 40.6 | 43.8 | 42.2 | 11.8 | 1.4 | 25.9 |
| 90/10 | 8.6 | 39.5 | 45 | 42.3 | 12.3 | 2.1 | 19.9 |
| 92.5/7.5 | NA | 40.4 | 45.4 | 42.9 | 13 | 1.3 | 17.2 |
| 100/0 | 4 | 45 | 44.1 | 44.6 | 15.7 | 0.5 | 2.3 |

Reference Example B

Samples of inorganic electrolyte containing 75 mole percent lithium sulfide (Li$_2$S) and 25 mole percent phosphorus sulfide (P$_2$S$_5$), suitable for use in making the solid-state composite electrolyte of the following examples, is made as follows. An inorganic electrolyte mixture of Li$_2$S (Sigma Aldrich, 99.98%) and P$_2$S$_5$ (Sigma Aldrich, 99%) is combined together and mechanically ball-milled using a planetary ball mill apparatus at 500 rpm, using a ZrO$_2$ grinding bowl and 110 grams of ZrO$_2$ balls having a diameter of 3 mm, for at least 20 hours in an argon atmosphere in a glove box at room temperature.

Individual composite pellet samples are formed by pressing 200 mg of the mixture in circular die at 300 MPa. The composite pellet sample is then first heated to 240 C for 10 minutes, and then the temperature is maintained while 150-200 MPa pressure is applied to the sample for 1 hour. The pressure is then released, and the composite pellet sample is additionally annealed at the same temperature for 30 min to remove remaining mechanical stress from the densification process. The composite pellet sample is then allowed to cool for several hours before further testing.

Examples 1 to 4

Four individual samples of the aramid polymer fibrils of Reference Example A are each combined with four individual samples of the inorganic electrolyte mixture of Reference Example B in amounts that create 4 individual samples of inorganic electrolyte having 1, 3, 5, and 10 weight percent aramid polymer fibrils, respectively. The four individual samples are then mixed in the ultrasonic mixer at 2,000 rpm for 10 min.

Composite pellets of composite electrolytes containing both inorganic electrolyte and aramid polymer fibrils are formed by separately pressing the four individual samples as was done in Reference Example B.

Comparative Examples A to D

Examples 1 to 4 are repeated; however the aramid polymer fibrils of Reference Example A are replaced with 100% commercially-available PPD-T pulp (Style 1F361, available from the DuPont Co., Wilmington, Delaware). The pulp is not stalk-free as defined herein and has a Canadian Standard Freeness of 260 ml and a specific surface area after drying of 9 m²/g. Composite pellets of composite electrolytes containing both inorganic electrolyte and PPD-T pulp are formed by separately pressing the four individual samples as is done in Reference Example B.

DISCUSSION

Visual inspection of cross sections of the composite pellets of the comparison Examples A to D will reveal large visible areas of aramid pulp. These large areas would obviously be an issue for very thin composites. Visual inspection of cross sections of the composite pellets of Examples 1-4 reveal fine distributed aramid polymer fibrils, creating a structure more suitable for very thin composites

What is claimed is:

1. A solid-state composite electrolyte, suitable for use in solid-state batteries, comprising:

70 to 99 weight percent inorganic solid electrolyte and 1 to 30 weight percent aramid polymer fibrils, based on the total weight of the inorganic solid electrolyte and aramid fibrils in the solid-state composite electrolyte, wherein the aramid polymer fibrils are stalk-free refined fibrils, the aramid polymer comprising a blend of polymers comprising 80 to 96 weight percent poly (paraphenylene terephthalamide) and 4 to 20 weight percent of poly (vinyl pyrrolidone), and wherein the aramid polymer fibrils have:

i) a diameter of 10 to 2000 nanometers, wherein the aramid polymer fibrils have a total diameter size range of 300 nanometers, ii) a length of 0.2 to 3 millimeters, iii) a specific surface area of 3 to 40 square meters/gram, and iv) a Canadian Standard Freeness of 0 to 100 milliliters;

the solid-state composite electrolyte having a thickness of 5 to 95 micrometers, the solid-state composite electrolyte having a fracture toughness of from 0.5 to 10 MPa m$^{1/2}$.

2. The solid-state composite electrolyte of claim 1 wherein the inorganic solid electrolyte comprises lithium sulfide, lithium oxide, or a mixture thereof.

3. The solid-state composite electrolyte of claim 2 wherein the inorganic solid electrolyte comprises a blend of:

a) 60 to 80 weight percent lithium sulfide or lithium oxide or a mixture thereof, and b) 20 to 40 weight percent phosphorus sulfide, based on the total weight of a) and b) in the inorganic solid electrolyte.

4. The solid-state composite electrolyte of claim 1 wherein the inorganic solid electrolyte comprises zirconia, germanium compounds, silicon compounds, or mixtures thereof, in an amount of 20 weight percent or more, based on the total weight of the inorganic solid electrolyte.

5. The solid-state composite electrolyte of claim 1 having an ionic conductivity of 0.1 to 100 milliSiemens per centimeter (mS/cm).

6. A solid-state battery comprising an anode, a cathode, and the solid-state composite electrolyte of claim 1.

7. A process for making a solid-state composite electrolyte, suitable for use in solid-state batteries, comprising the steps of:

a) combining 70 to 99 parts by weight inorganic solid electrolyte and 1 to 30 parts by weight aramid polymer fibrils, based on 100 total parts of the inorganic solid electrolyte and aramid fibrils, to form a mixture;

b) consolidating the mixture by the application of pressure and heat for a time sufficient to form a solid-state composite electrolyte having a thickness of 5 to 95 micrometers and a fracture toughness of from 0.5 to 10 MPa m$^{1/2}$;

wherein the aramid polymer fibrils are stalk-free refined fibrils, the aramid polymer comprising a blend of polymers comprising 80 to 96 weight percent poly (paraphenylene terephthalamide) and 4 to 20 weight percent of poly (vinyl pyrrolidone), and wherein the aramid polymer fibrils have i) a diameter of 10 to 2000 nanometers, wherein the aramid polymer fibrils have a total diameter size range of 300 nanometers, ii) a length of 0.2 to 3 millimeters, iii) a specific surface area of 3 to 40 square meters/ gram, and iv) a Canadian Standard Freeness of 0 to 100 milliliters.

8. The process of claim 7 wherein the inorganic solid electrolyte comprises lithium sulfide, lithium oxide, or a mixture thereof.

9. The process of claim 8 wherein the inorganic solid electrolyte comprises a blend of:

a) 60 to 80 weight percent lithium sulfide or lithium oxide or a mixture thereof, and b) 20 to 40 weight percent phosphorus sulfide, based on the total weight of a) and b) in the inorganic solid electrolyte.

10. The process of claim 7 wherein the inorganic solid electrolyte comprises zirconia, germanium compounds, silicon compounds, or mixtures thereof, in an amount of 20 weight percent or more, based on the total weight of the inorganic solid electrolyte.

11. The process of claim 7 wherein the solid-state composite electrolyte has an ionic conductivity of 0.1 to 100 milliSiemens per centimeter (mS/cm).

\* \* \* \* \*